(12) United States Patent
Rousson

(10) Patent No.: US 8,774,519 B2
(45) Date of Patent: Jul. 8, 2014

(54) LANDMARK DETECTION IN DIGITAL IMAGES

(75) Inventor: Michael Rousson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 13/568,551

(22) Filed: Aug. 7, 2012

(65) Prior Publication Data

US 2014/0044359 A1 Feb. 13, 2014

(51) Int. Cl.
*G06K 9/46* (2006.01)

(52) U.S. Cl.
USPC ........... 382/190; 382/117; 382/119; 382/194; 382/195

(58) Field of Classification Search
None
See application file for complete search history.

(56) References Cited

U.S. PATENT DOCUMENTS

| | | | | |
|---|---|---|---|---|
| 8,331,698 B2 * | 12/2012 | Li | | 382/224 |
| 2009/0220148 A1 * | 9/2009 | Levy et al. | | 382/163 |
| 2010/0086214 A1 * | 4/2010 | Liang et al. | | 382/197 |
| 2012/0308124 A1 * | 12/2012 | Belhumeur et al. | | 382/159 |
| 2013/0028522 A1 * | 1/2013 | Perlmutter et al. | | 382/197 |

* cited by examiner

*Primary Examiner* — Jason M Repko
*Assistant Examiner* — David Perlman
(74) *Attorney, Agent, or Firm* — Wong, Cabello, Lutsch, Rutherford & Brucculeri, LLP

(57) ABSTRACT

Techniques are disclosed for generating landmark models based on exemplar portions of images ("patches") that are known to include the target landmark (forming a "positive" set of landmark vectors) and those that do not (forming a "negative" set of landmark vectors). Theses sets of positive and negative landmark vectors, along with other landmark statistics, form a landmark model. When an unknown image is received, candidate landmark vectors may be generated based on the image's content (or portion thereof) and applied to the landmark model to rapidly reduce the dimensionality (complexity) of the candidate landmark vector space. Landmark models may be applied to the reduced-dimensioned candidate landmark vectors to identify the most likely point corresponding to the target landmark.

18 Claims, 8 Drawing Sheets

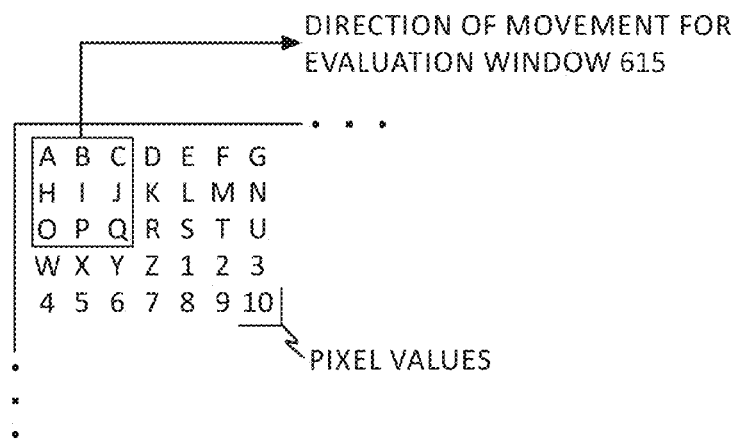
FIG. 6B
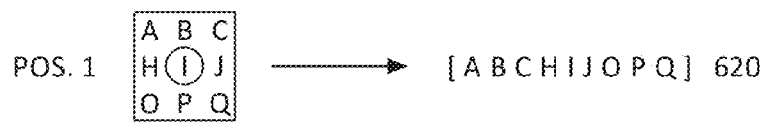
FIG. 6C
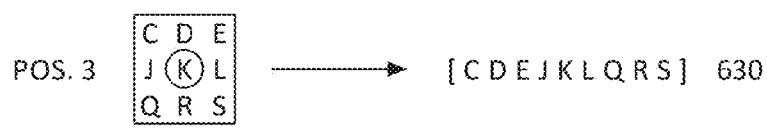

LANDMARK DETECTION IN DIGITAL IMAGES

BACKGROUND

This disclosure relates generally to the field of image processing. More particularly, but not by way of limitation, this disclosure relates to a technique for identifying landmark features in a digital image.

Facial landmark detection is the process of analyzing an image to identify and locate reference nodes (aka landmarks) on a face and is a critical step in computer vision that precedes many important tasks such as expression recognition, face recognition, red-eye removal, face alignment and face tracking. In general, obtaining an estimate of facial landmarks is an ill-conditioned problem due to pose, illumination, and expression variations. These factors compromise the performance of most facial landmark detection methods. It would be beneficial therefore to provide a mechanism that provides robust, high-quality landmark detection capability.

SUMMARY

In one embodiment the inventive concept provides a method to identify the location of landmarks in a digital image. The method includes obtaining a bounding box that delimits a portion of the image (the contents of which include a first group of pixels). A candidate landmark vector may be generated for each of a second group of pixels (the second group of pixels consisting of a subset of the first group of pixels). For landmark accuracy and robustness, these candidate landmark vectors are generally highly dimensioned. In accordance with this disclosure, the dimension of the candidate landmark vectors may be reduced at run-time using a priori model data. This model data may be based on positive and negative landmark exemplars: positive exemplars corresponding to image portions known to include the target landmark, and negative exemplars corresponding to image portions known not to include the target landmark.

After dimensional reduction, model data may be applied to the candidate landmark vectors to generate positive and negative sets of likelihood values, where there is one positive and one negative likelihood value for each candidate landmark vector. Corresponding positive and negative likelihood values may be combined to generate an overall likelihood value for each pixel in the second group of pixels. That pixel (from the second group of pixels) having the largest overall likelihood value may be designated as the most likely landmark pixel. In another embodiment, each candidate landmark vector may be normalized (e.g., in accordance with the mean and variance of its constituent components' values) prior to dimensional reduction operations. A computer executable program to implement the method may be stored in any media that is readable and executable by a computer system.

BRIEF DESCRIPTION OF THE DRAWINGS

FIGS. 6A-6C illustrate the generation of candidate landmark vectors in accordance with one embodiment.

DETAILED DESCRIPTION

This disclosure pertains to systems, methods, and computer readable media to accurately localize landmark points in images such as facial features (e.g., eyes, nose, chin). In general, techniques are disclosed for generating landmark models based on exemplar portions of images ("patches") that are known to include the target landmark (forming a "positive" set of landmark vectors) and those that do not (forming a "negative" set of landmark vectors). Theses sets of positive and negative landmark vectors, along with other landmark statistics, form a landmark model. When an unknown image is received, candidate landmark vectors may be generated based on the image's content (or portion thereof). The landmark models may then be used to rapidly reduce the dimensionality of the candidate vectors and, in so doing, improve the speed at which landmark identification may be performed. The landmark models may then be applied to the reduced-dimensioned candidate landmark vectors to identify the most likely location of the target landmark may be identified.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing and analysis systems having the benefit of this disclosure.

Figure 1:
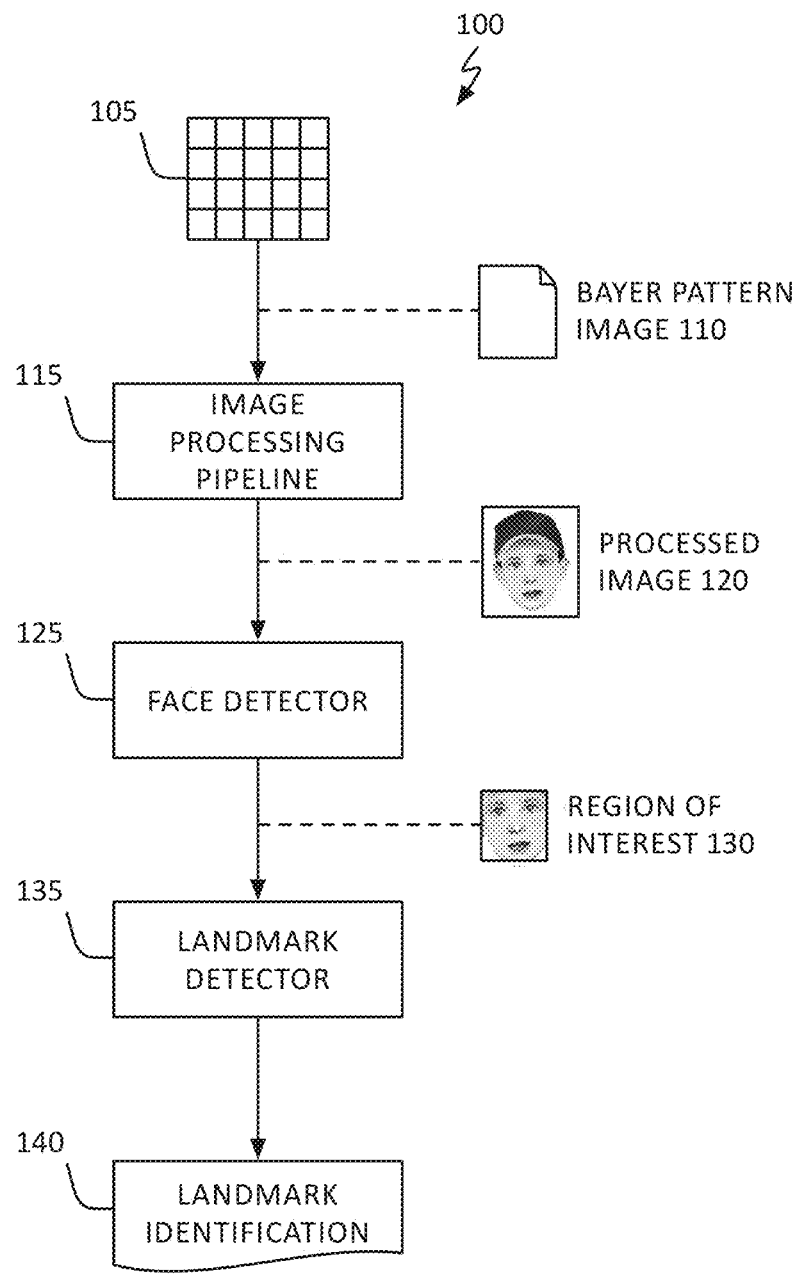
FIG. 1 shows, in block diagram form, an image processing system in accordance with one embodiment.

Referring to FIG. 1, image processing system 100 in accordance with one embodiment includes image sensor 105 (providing raw sensor data 110), image processing pipeline 115 (generating finished image 120), face detector 125 (identifying region of interest 130 within finished image 120), and landmark detector 135 (indicating where, within region of interest 130, a target landmark is located 140). Image sensor 105 may, for example, be a charge-coupled device (3D) or a complementary metal-oxide semiconductor (CMOS) sensor, both of which can produce a Bayer pattern image (i.e., raw sensor data 110). Image processing pipeline 115 may then provide demosaicing to interpolate a set of complete red, green, and blue values for each pixel. Image processing pipeline 115 may also provide noise reduction, white balance, color correction, and color-space conversion. As shown in FIG. 1, image processing pipeline 115 generates processed image 120—which can be in any of a number of formats such as JPEG (Joint Photographic Experts Group), TI 5 (Tagged Image File Format), Exif (Exchangeable image file format), RAW and may also include luminance (Y) and chrominance (CbCr) information. Face detector 125 typically applies a number of detectors to processed image 120 to identify region of interest 130. Region of interest 130, in turn, identifies an area within processed image 120 that encloses a face (often a "registered" face; a face that has been adjusted to be a standard size and have a standard orientation). In one embodiment, region of interest 130 is a rectangle identified by its center point and width.

As described in more detail below, landmark detector 135 operates on region of interest 130 to identify the most likely location of the target landmark (e.g., output 140). In the following, landmark detection is described in terms of locating a facial landmark (e.g., an eye or a corner of a mouth). More specifically, the target landmark in the description below is the center of an eye. It will be recognized that the techniques disclosed herein may also be used to detect other facial landmarks (e.g., eyebrows, nose, chin, mouth). It will also be recognized that techniques in accordance with this disclosure may also be applied to detecting other types of landmarks (e.g., finger-tips, shoulder points, triangle vertices).

Figure 2:
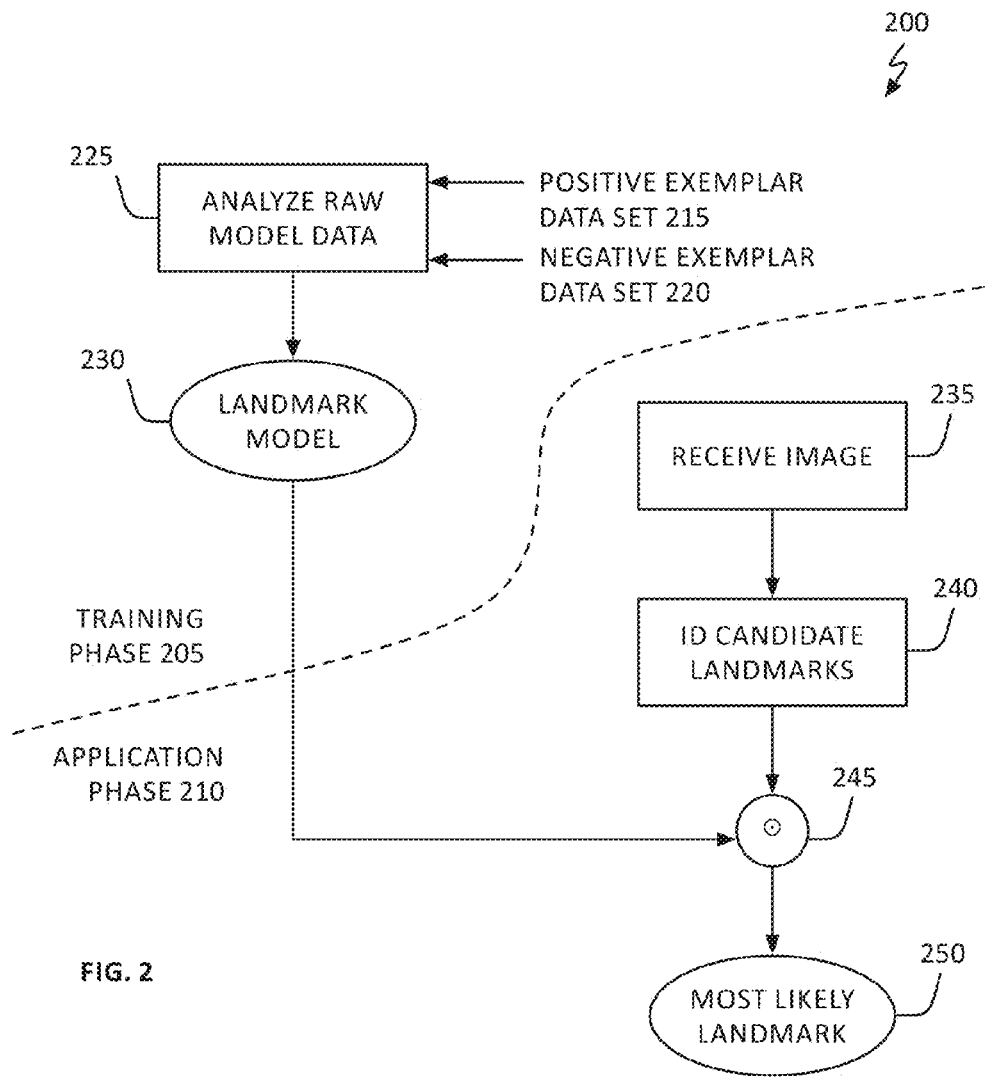
FIG. 2 shows, in flowchart form, a landmark detection operation in accordance with one embodiment.
Figure 3A:
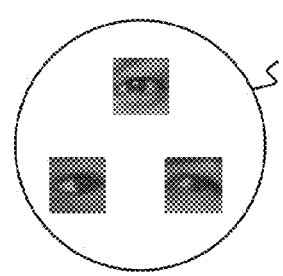
FIGS. 3A and 3B show positive and negative landmark patch sets in accordance with one embodiment.
Figure 3B:
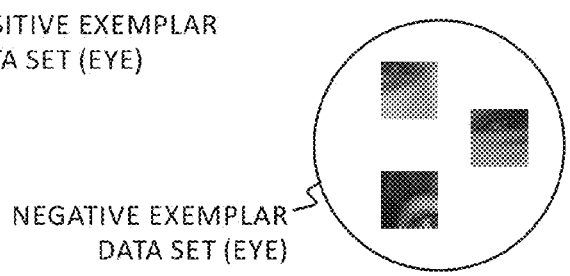

Referring to FIG. 2, landmark detection operation 200 in accordance with one embodiment may consist of two phases: training phase 205 and application phase 210. During training phase 205, exemplar data sets 215 and 220 may be analyzed (block 225) to generate landmark model 230. Positive exemplar data set 215 includes image portions or patches in which the target landmark is centered while negative exemplar data set 220 includes image patches that are known to be around, but do not include, the target landmark. By way of example, if the target landmark is an eye, positive exemplar data set 215 may consist of a number of image patches that are known to contain various eyes (see FIG. 3A) and negative exemplar data set 220 may consist of a number of image patches that are known to not contain eyes (see FIG. 3B). As noted above, training phase 205 may be performed for any number of target landmarks. For example, if facial landmarks are being detected one or more eye (left and right), nose, mouth and eyebrow landmark models may be generated. During application phase 210, images may be received (block 235) and from them candidate landmark descriptors identified (block 240). Landmark model 230 may then be applied to these descriptors (operation 245) and the most likely landmark location identified 250.

In the following, an illustrative patch training operation will be described based on evaluating a set of positive landmark patches to generate positive baseline landmark data. Each of the described actions should be repeated for the corresponding negative landmark patches to generate negative baseline landmark data. The combination of positive and negative baseline landmark data constitute a landmark model in accordance with this disclosure.

Figure 4:
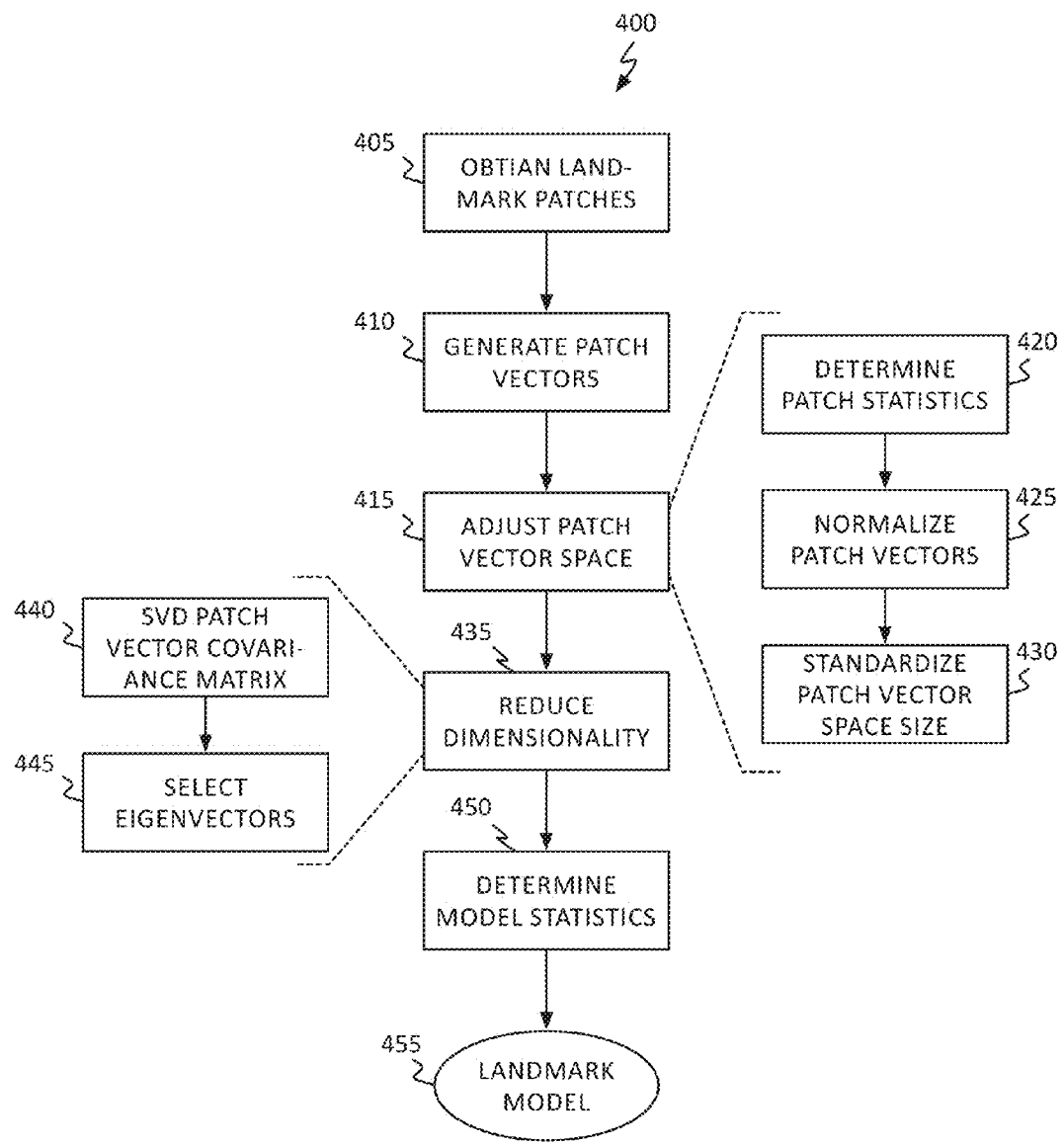
FIG. 4 shows, in flowchart form, a landmark detection learning phase operation in accordance with one embodiment.

Referring to FIG. 4, illustrative landmark training phase 400 begins by obtaining 'N' positive landmark patches (block 405). In practice, N should be large enough to yield the desired detection accuracy/robustness. In addition, individual patches should be large enough to provide enough resolution to identify the target landmark. In the following, and for purposes of illustration only, N will be taken to be 2500 and each patch will be assumed to be a (32×32) array of 8 bit pixels (e.g., luminance).

Each patch may then be represented as a 1D vector (block 410). Table 1 illustrates one approach to converting a 2D patch into a 1D patch vector in accordance with block 410. As shown, a 2D positive landmark patch organized as a (32×32) array of pixel values may be converted into a 1D positive patch vector having 1024 component values by concatenating the patch's pixels on a row-by-row basis. While a row-by-row approach has been adopted here, patch vectors may also be generated by concatenating a patch's pixels in any way that allows the target landmark to be detected. This includes not using every pixel in a patch. For example, if a patch is large every other or every third pixel may be used to generate the patch vector.

TABLE 1

An Illustrative Landmark Patch to Vector Conversion $$i^{th} \text{ patch} = \begin{bmatrix} p_{1,1} & \cdots & p_{1,32} \\ \vdots & \ddots & \vdots \\ p_{32,1} & \cdots & p_{32,32} \end{bmatrix} \rightarrow [\, p_{1,1}, p_{1,2}, \square \quad p_{1,32} \square \quad p_{32,32}\,] = \vec{p}_i$$

The collection of (2500) positive patch vectors may next be adjusted (block 415). In one embodiment, patch vector space adjustment operations in accordance with block 415 may include determining a mean ($\mu$) and variance ($\sigma^2$) for each patch vector (block 420), using this information to normalize individual patch vector component values (block 425), and reducing the size or dimension of the patch vector space to a desired value (block 430). By way of example, and in accordance with block 420, patch vector $\vec{p}_1$ yields mean $\mu_1$ and variance $\sigma_1^2$, patch vector $\vec{p}_2$ yields mean $\mu_2$ and variance $\sigma_2^2$, . . . where $\mu_i$ represents the mean of all the individual component values in patch vector $\vec{p}_i$ and $\sigma_i^2$ represents the variance of all the individual component values in patch vector $\vec{p}_i$. Letting $\vec{p}_i[j]$ represent the value of the j-th component of patch vector $\vec{p}_i$, patch vector normalization in accordance with block 425 may be accomplished as follows.

$$\text{For } i = 1 \rightarrow N \text{ and } j = 1 \rightarrow 1024: \quad \vec{p}_i[j] \leftarrow \frac{(\vec{p}_i[j] - \mu_i)}{\sigma_i^2}, \qquad \text{EQ. 1}$$

where the "arrow" ($\leftarrow$) notation indicates that the component value on the left (arrowhead side) is replaced by a value as determined by the formula on the right. It has been found that normalization in accordance with block 425 and EQ. 1 may aid in reducing the effect of illumination and contrast differences between the different patches/patch vectors. The collection of N normalized patch vectors may be aggregated to form a matrix having dimensions (N×1024). This matrix may be used to generate a square covariance matrix 'A' having dimensions (1024×1024) (block 430).

To make implementing landmark detection operations in accordance with this disclosure better suited to platforms having limited computational capabilities and/or to increase the speed of landmark detection operations, the dimensionality of the patch vector space resulting from operations in accordance with block 415 may be reduced (435). In one embodiment this may be accomplished by performing singular value decomposition (SVD) on covariance matrix A (block 240). (The combination of forming covariance matrix A and applying SVD to it, is sometimes referred to as principal component analysis, PCA.) After SVD has been performed, the first 'n' eigenvectors ($\vec{e}$) thereof may be selected to form a reduced dimensionality patch vector space (block 445). In the illustrative implementation using landmark patches composed of (32×32) arrays of 8 bit Y channel pixel values, and a (1024×1024) covariance matrix whose individual component values are 32 bit values, it has been found that the first 128 eigenvectors (i.e., n=128) provide sufficient information to enable robust landmark detection operations. The result of operations in accordance with block 435 is a positive patch projection matrix 'P' having dimensions (1024×128), each component represented by a 32 bit value. The choice of how many eigenvectors to use to form a reduced dimensionality vector space (embodied in positive patch projection matrix P) is a matter of design choice. For example, fewer eigenvectors may be selected (resulting in a smaller dimensioned projection matrix) if less accurate or robust landmark detection is tolerable. Similarly, more eigenvectors may be selected (resulting in a larger projection matrix) if more accurate or robust landmark detection is needed.

By viewing positive patch projection matrix P as a Gaussian distributed vector space, mean and variance values ($\mu$ and $\sigma^2$) for each of the 128 (1024×1) vector in positive patch projection matrix P may be found (block 450), the collections of which may be represented in vector notation as:

$$\begin{bmatrix} \mu_1 \\ \vdots \\ \mu_{128} \end{bmatrix} \text{ and } \begin{bmatrix} \sigma_1^2 \\ \vdots \\ \sigma_{128}^2 \end{bmatrix}.$$

The aggregate of positive patch projection matrix P and the above model statistics form a positive patch baseline dataset.

As noted above, each of the above actions should be repeated for a corresponding set of 'M' negative landmark patches to generate a negative patch baseline dataset. In general, it may be useful to use the same number of positive and negative patches (i.e., N=M), but this is not necessary. For example, it the collection of positive landmark patches is less "accurate" in identifying or characterizing the target landmark that the corresponding collection of negative landmark patches are to identifying the absence of the target landmark, it may be useful to use more positive patches to form the positive patch baseline dataset than are used to form the negative patch baseline dataset. The combination of positive and negative baseline landmark datasets constitute a landmark model in accordance with this disclosure. Illustrative landmark training phase 400 is summarized in Table 2.

TABLE 2

Landmark Model Generation for an Illustrative Embodiment

| | |
|---|---|
| Obtain N positive patches, each patch consisting of a (32 × 32) pixel array of 8-bit luminance values: | $\text{Patch}_1$ $\text{Patch}_2$ $\cdots$ $\text{Patch}_N$ $(32 \times 32)$ $(32 \times 32)$ $(32 \times 32)$ |
| Generate N (1 × 1024) positive patch vectors, where 'a' and 'b' represent individual components within the identified patch vectors): | $\vec{p}_1 = [a_1, a_2, \square \; a_{1024}]$ $\vdots$ $\vec{p}_N = [b_1, b_2, \square \; b_{1024}]$ $\rightarrow \begin{bmatrix} [\vec{p}_1] \\ \vdots \\ [\vec{p}_N] \end{bmatrix}_{N \times 1024}$ |
| Normalize each positive patch vector component, each component represented by a 32-bit value: | $\bar{p}_1 = \left[\frac{(a_1 - \mu_1)}{\sigma_1^2}, \square \; \frac{(a_{1024} - \mu_1)}{\sigma_1^2}\right]$ $\vdots$ $\bar{p}_N = \left[\frac{(b_1 - \mu_N)}{\sigma_N^2}, \square \; \frac{(b_{1024} - \mu_N)}{\sigma_N^2}\right]$ $\rightarrow \begin{bmatrix} \vec{p}_1^{norm} \\ \vdots \\ \vec{p}_N^{norm} \end{bmatrix}_{N \times 1024}$ |
| Generate a (1024 × 1024) positive covariance matrix: | $[A]_{1024 \times 1024}$ |
| Apply SVD to covariance matrix A to generate 1024 eigenvectors: | $\text{SVD}\{[A]\} = [\langle\vec{e}_1\rangle_{1024 \times 1} \cdots \langle\vec{e}_{1024}\rangle_{1024 \times 1}]_{1024 \times 1024}$ |
| Select 128 largest eigenvectors to form a positive landmark projection matrix, P: | $[P] = [\langle\vec{e}_1\rangle_{1024 \times 1} \cdots \langle\vec{e}_{128}\rangle_{1024 \times 1}]_{1024 \times 128}$ |
| Determine mean ($\mu$) and variance ($\sigma^2$) statistics for positive landmark projection matrix P: | $\begin{bmatrix} \mu_1 \\ \vdots \\ \mu_{128} \end{bmatrix}$ and $\begin{bmatrix} \sigma_1^2 \\ \vdots \\ \sigma_{128}^2 \end{bmatrix}$ |

TABLE 2-continued

Landmark Model Generation for an Illustrative Embodiment

Aggregate positive landmark projection matrix P and associated statistics ($\mu$ and $\sigma^2$) to form positive patch baseline dataset:

$$[P], \begin{bmatrix} \mu_1 \\ \vdots \\ \mu_{128} \end{bmatrix} \text{ and } \begin{bmatrix} \sigma_1^2 \\ \vdots \\ \sigma_{128}^2 \end{bmatrix}$$

Repeat each of the above steps for M negative patches, wherein each patch consists of a (32 × 32) pixel array of 8-bit luminance values.

---

Figure 5:
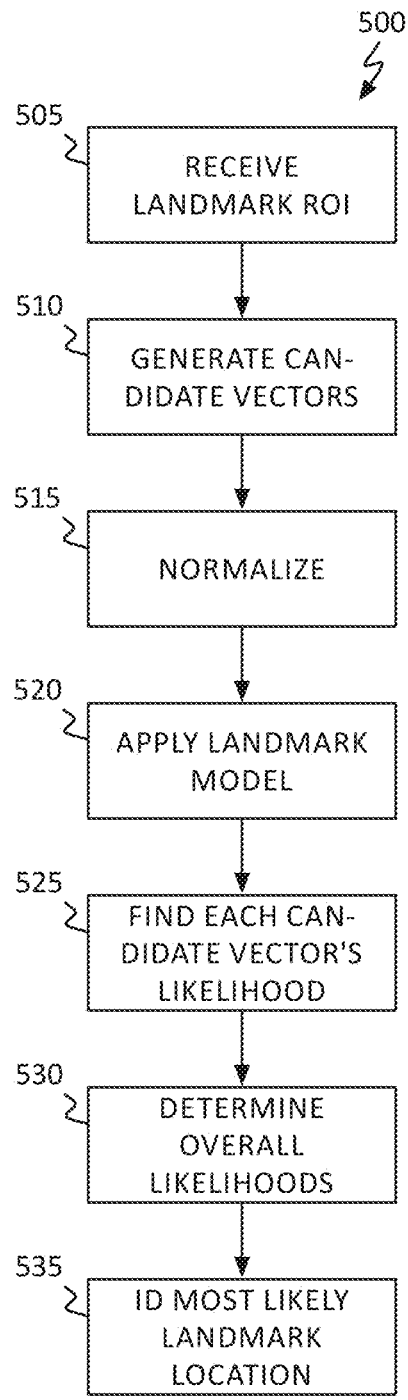
FIG. 5 shows, in flowchart form, a landmark detection application phase operation in accordance with one embodiment.

Referring to FIG. 5, illustrative landmark detection application phase 500 begins when a landmark region of interest (ROI) is received (block 505). In the case of facial landmark detection operations, the ROI may identify an area within a processed image that encloses a face (see discussion above regarding FIG. 1). Candidate landmark vectors may then be generated based on this ROI (block 510).

Figure 6A:
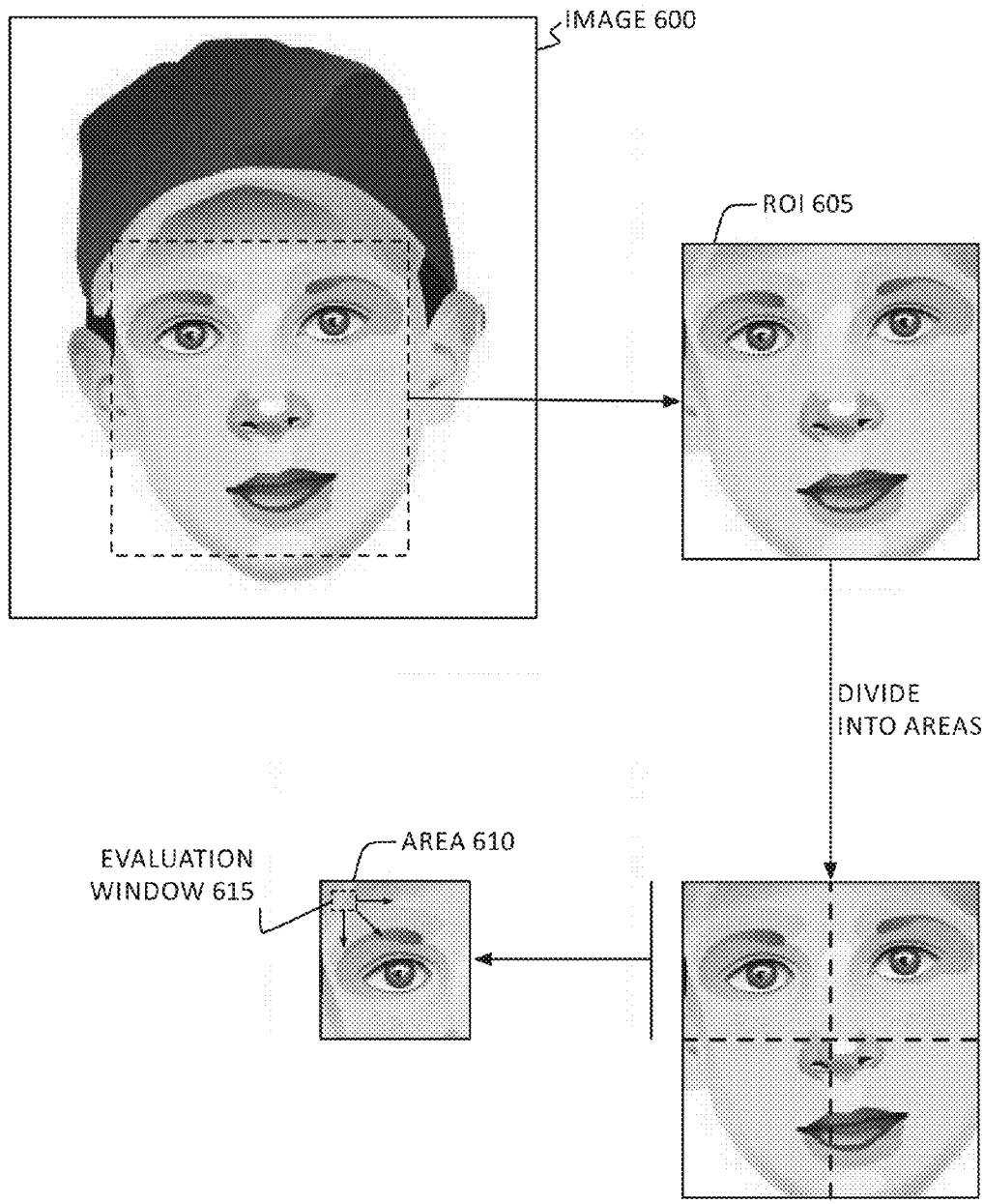

Actions in accordance with one embodiment of block 510 may be understood by referring to FIG. 6. Beginning with FIG. 6A, image 600 provides ROI 605 which may be partitioned into a number of areas (e.g., 4), one of which may be selected for evaluation (e.g., region 610). Division of ROI 605 into areas may be done to improve landmark detection accuracy and speed. For example, if the target landmark is the center of a left eye, upper-left area 610 may be selected because this is the area in which a left eye is mostly likely to exist. In line with this recognition, ROI 605 may be partitioned into fewer (e.g., 1, 2 or 3) or more (e.g., 5, 8 or 10) areas. The precise number and relative location of each area may be a function of the target landmark and the size or extent of the region of interest.

Once ROI 605 has been obtained and area 610 selected, evaluation window 615 may be centered about selected pixels within area 610 and a candidate landmark vector generated for each such selected pixel. Referring to FIG. 6B, an expanded portion of area 610 is shown comprising a number of pixel values and an initial location and indicted direction of motion for evaluation window 615. Referring to FIG. 6C, when evaluation window 615 is in a first position centered about pixel 'I', candidate landmark vector 620 may be generated. When evaluation window 615 has been moved to a second position so that it is centered about pixel 'J', candidate landmark vector 625 may be generated, and when evaluation window 615 has been moved to a third position so that it is centered about pixel 'K', candidate landmark vector 630 may be generated. In the embodiment illustrated in FIG. 6, candidate landmark vectors (e.g., vectors 620, 625 and 630) were generated by concatenating the individual pixels within evaluation window 615 on a row-by-row basis. As with the generation of patch vectors in accordance with block 410 (see FIG. 4), candidate landmark vectors in accordance with block 510 may be generated in any manner the designer determines is appropriate for their implementation.

Continuing the numeric example begun above, if ROI 605 measures (128×128) pixels, area 610 (64×64) pixels, evaluation window (32×32) pixels, and if evaluation window 615 is centered about every pixel within area 610 that is possible while keeping evaluation window 615 wholly within area 610, 1024 candidate landmark vectors may be generated. The collection of all such vectors may be represented as matrix C as follows:

$$\begin{array}{c} \vec{c}_1 = [d_1, d_2, \square\, d_{1024}] \\ \vdots \\ \vec{c}_{1024} = [g_1, g_2, \square\, g_{1024}] \end{array} \rightarrow [C] = \begin{bmatrix} \vec{c}_1 \\ \vdots \\ \vec{c}_{1024} \end{bmatrix}_{1024 \times 1024},$$

where 'd' and 'g' represent individual component values within the identified candidate landmark vectors.

Referring again to FIG. 5, following actions in accordance with block 510 individual components within candidate landmark vectors $\vec{c}_1$ through $\vec{c}_{1024}$ may be normalized in the same manner as described above in connection with block 425 (block 515). As before, normalization may help to compensate for differences in illumination and contrast across the candidate landmark vectors. Once normalized, positive and negative patch baseline datasets may be used to generate reduced dimensionality positive and negative candidate landmark vector sets, [X] and [Z] respectively (block 520):

$$[C][P_{pos}] = \begin{bmatrix} \vec{x}_1 \\ \vdots \\ \vec{x}_{1024} \end{bmatrix} = [X]_{1024 \times 128} \text{ and}$$

$$[C][P_{neg}] = \begin{bmatrix} \vec{z}_1 \\ \vdots \\ \vec{z}_{1024} \end{bmatrix} = [Z]_{1024 \times 128}, \text{ where}$$

$[P_{pos}]$ represents the positive patch vector projection matrix and $[P_{neg}]$ the negative patch vector projection matrix (see Table 2). At this point, the are two candidate landmark vector sets: positive candidate landmark vector set [X] having 1024 vectors (each having 128 components); and a negative candidate landmark vector set [Z] having 1024 vectors (each of which also has 128 components).

A likelihood value for each vector in positive and negative candidate landmark vector sets may now be determined (block 525). Likelihood values for positive candidate landmark vectors represent the likelihood that the corresponding positive candidate landmark vector is the target landmark (e.g., the center of an eye). Likelihood values for negative candidate landmark vectors represent the likelihood that the corresponding negative candidate landmark vector is not the target landmark.

In one embodiment, the likelihood that pixel 'i'—represented by positive candidate landmark vector $\vec{x}_i$ in [X]—in evaluation window 615 is the target landmark may be given by:

$$P(i) = \frac{1}{\sigma_i^2} \sum_{j=1}^{128} (x_j - \mu_i)^2, \qquad \text{EQ. 2}$$

where $x_j$ represents the j-th component value in $\vec{x}_i$, and $\mu_i$ and $\sigma_i^2$ represent the mean and variance values for the positive patch projection matrices i-th vector, $\vec{x}_i$ (see Table 2). In like fashion, the likelihood that pixel 'i' is not the target landmark may be given by:

$$\overline{P}(i) = \frac{1}{s_i^2} \sum_{j=1}^{128} (z_j - m_i)^2, \qquad \text{EQ. 3}$$

where $z_j$ represents the j-th component value in $\vec{z}_i$ (that vector in negative candidate landmark vector set [Z] corresponding to pixel 'i'), and $m_i$ and $s_i^2$ represent the mean and variance values for the negative patch projection matrices i-th vector, $\vec{z}_i$ Table 2).

The overall likelihood that the i-th pixel in evaluation window 615 is the target landmark may now be given as the sum of the corresponding positive and negative likelihood values as expressed in EQS. 2 and 3 (block 530):

$$P_o(i) = P(i) + \overline{P}(i). \qquad \text{EQ. 4}$$

While positive and negative likelihood values $P(i)$ and $\overline{P}(i)$ have been combined via simple addition in EQ. 4, no such limitation should be applied to the disclosed methods. For example, in another embodiment weighted positive and negative likelihood values may be combined to return an overall likelihood value.

Once an overall likelihood value for each corresponding pair of candidate landmark vectors has been found, that pixel corresponding to the highest overall likelihood value may be selected as the most likely candidate location (block 535).

In one embodiment, landmark detection application phase 500 only identifies that pixel having the largest overall likelihood value. In another embodiment, both the most likely pixel and the corresponding overall likelihood value may be identified. In still another embodiment, if the most likely pixel's overall likelihood value (e.g., selected in accordance with block 535) is less than a specified threshold, an indication that the target landmark was not found may be returned by operation 500.

Figure 7:
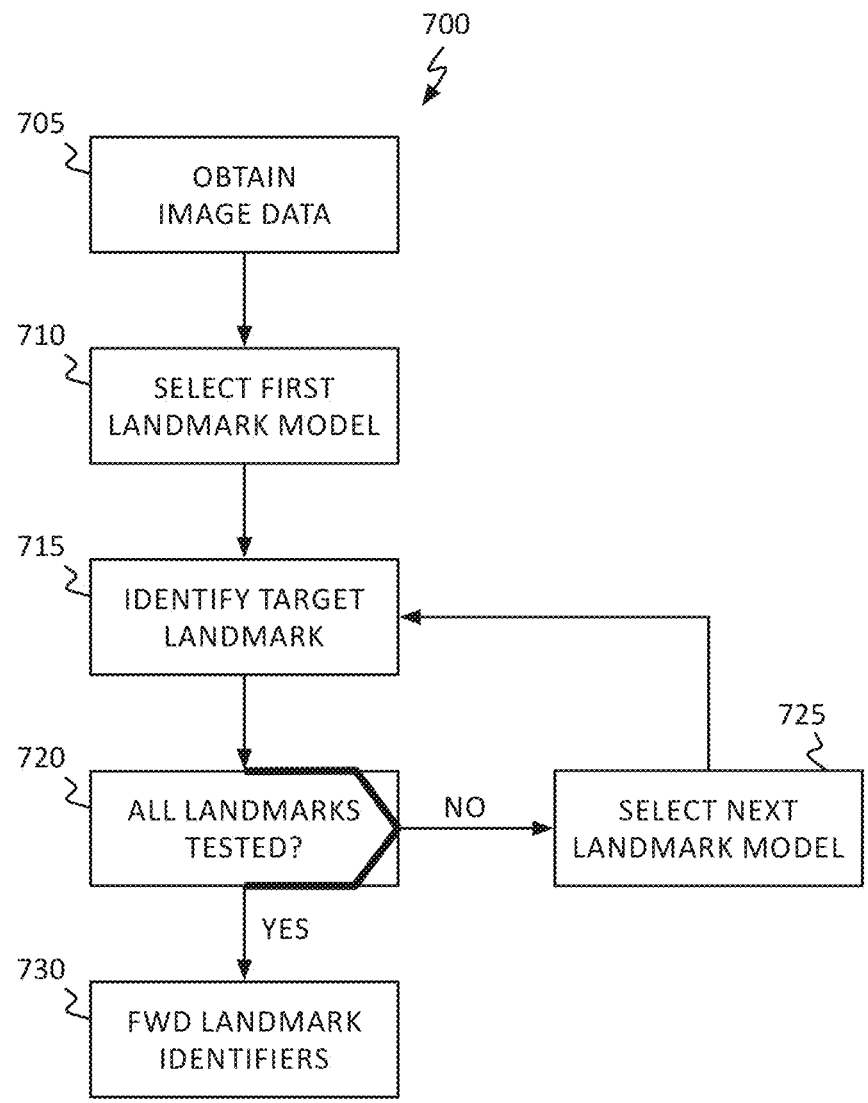
FIG. 7 shows, in flowchart form, a landmark detection operation in accordance with another embodiment.

The above discussion is presented in terms of locating a single landmark. Referring to FIG. 7, landmark detection operation 700 presents one approach to searching for multiple landmarks. To begin, image data is obtained (block 705). In one embodiment, the obtained image data may comprise a specified region of a larger image. In another embodiment, the entirety of an image may be obtained. A first landmark is selected (block 710) and the image data processed in accordance with that model (block 715). For example, the first landmark model could correspond to the center (or left extent, or right extent) of a left eye. In another embodiment, the first landmark model could correspond to the center (or left extent, or right extent) of a mouth. In yet another embodiment, the first landmark model could correspond to the center (or left extent, or right extent) of a nose. In still another embodiment, other target landmarks may be detected (e.g., fingertips and shoulder-points). Once the current target landmark has been identified, a test may be made to determine if additional landmark models are to be evaluated (block 720). It should be noted, different landmark models may operate on different portions of the obtained image data. If at least one landmark model remains to be evaluated (the "NO" prong of block 720), a next landmark model may be selected (block 725), where after landmark detection operation 700 continues at block 715. If all landmark models have been evaluated (the "YES" prong of block 720), landmark detection results may be forward to subsequent image processing modules. Illustrative "down-stream" processing modules include, but are not limited to, face and object (e.g., cars, trains, planes, specified animals, and the like) recognition modules, and image enhancement modules such as those employed for red-eye detection and correction. In addition, landmark detection results may be retained in or with metadata associated with the image data. Such metadata may be stored integral to, or separate from, the image data.

Figure 8:
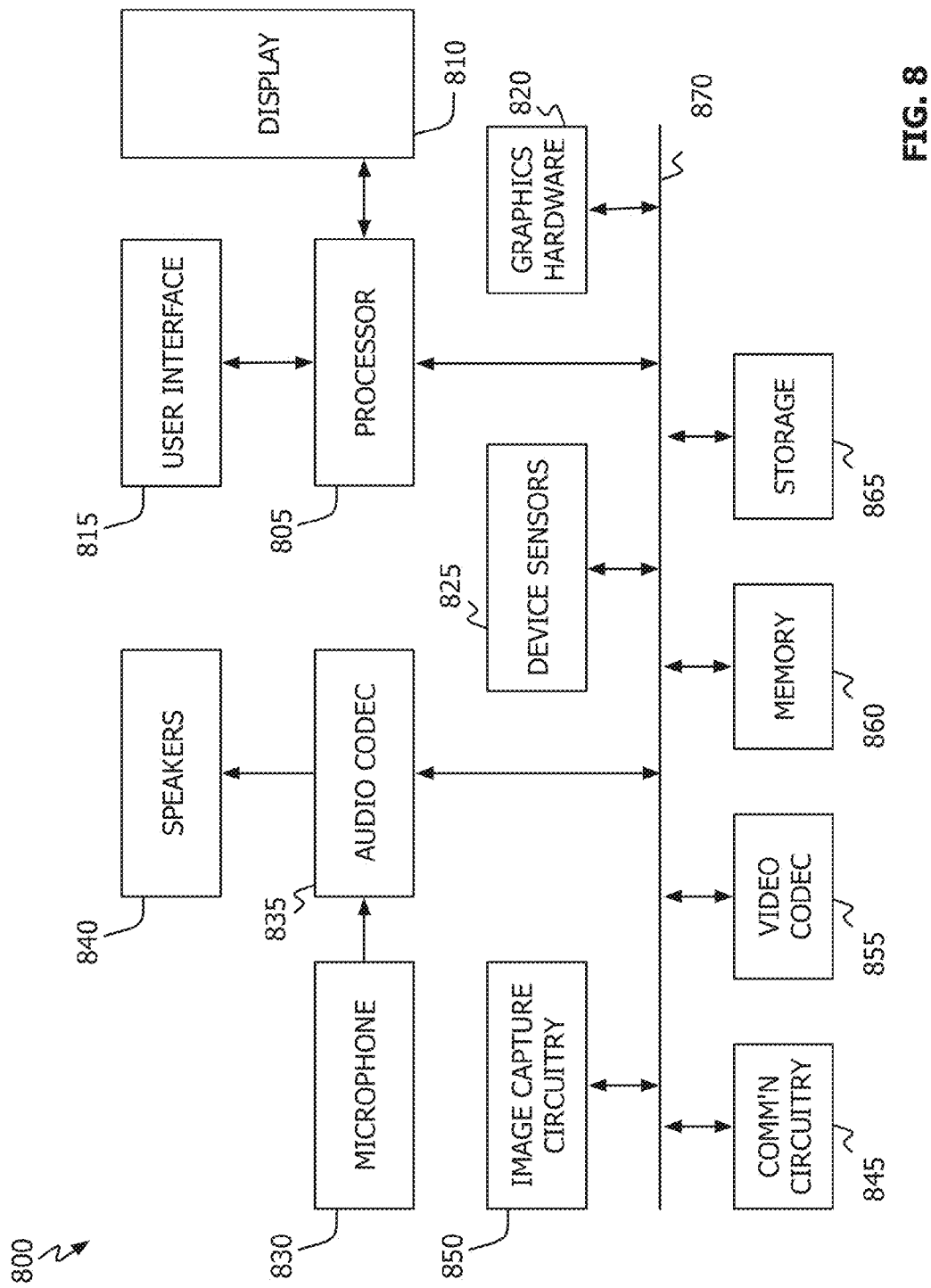
FIG. 8 shows, in block diagram form, a multifunction device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, a mobile telephone, or a notebook, laptop or tablet computer system.

Processor 805 may execute instructions necessary to carry out or control the operation of many functions performed by device 800 (e.g., such as the processing of images in accordance with operations 500 and 700). Processor 805 may, for instance, drive display 810 and receive user input from user interface 815. User interface 815 can take a variety of forms, such as a button, keypad, dial, a click wheel, keyboard, display screen and/or a touch screen. Processor 805 may be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 process graphics information. In one embodiment, graphics hardware 820 may include a programmable graphics processing unit (GPU).

Sensor and camera circuitry 850 may capture still and video images that may be processed to generate images in accordance with this disclosure and may, for example, incorporate image processing pipeline 100. Output from camera circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The disclosed landmark detection operations perform a run-time reduction of the landmark vector space's dimensionality, whereas prior art approaches do not. As a result, the run-time complexity for landmark detection may be reduced from XXX (prior art) to XXX: where 'N' represents the number of candidate landmark vectors, 'P' the size of the candidate landmark vectors, and 'K' the number of eigenvectors used for the projection operation. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:
    obtain a face bounding box comprising a first plurality of pixels;
    generate a candidate vector for each of a second plurality of pixels, the second plurality of pixels comprising a subset of the first plurality of pixels;
    reduce the dimensionality of each of the candidate vectors;
    apply positive landmark population statistics to each candidate vector to generate a positive likelihood value for each of the candidate vectors;
    apply negative landmark population statistics to each candidate vector to generate a negative likelihood value for each of the candidate vectors;
    combine each of the positive likelihood value and the negative likelihood value, corresponding to the same candidate vector to form an overall likelihood value for each candidate vector; and
    select at least one pixel from the face bounding box as a landmark pixel based, at least in part, on the overall likelihood values.

2. The non-transitory program storage device of claim 1, wherein the instructions to cause the processor to obtain a face bounding box, further comprise instructions to cause the processor to partition the face bounding box into a plurality of evaluation regions.

3. The non-transitory program storage device of claim 2, wherein the instructions to cause the processor to generate a candidate vector for each of a second plurality of pixels, comprise instructions to cause the processor to:
    select one of the plurality of evaluation regions; and
    generate a candidate vector for each of a second plurality of pixels from the selected evaluation region.

4. The non-transitory program storage device of claim 3, wherein the instructions to cause the processor to select one of the plurality of evaluation regions, comprise instructions to cause the processor to select an evaluation region in which a landmark is expected.

5. The non-transitory program storage device of claim 1, wherein the instructions to cause the processor to generate a candidate vector for each of a second plurality of pixels, comprise instructions to cause the processor to:
    select an area comprising a plurality of pixels surrounding each of the second plurality of pixels; and
    generate a candidate vector each of the second plurality of pixels based, at least in part, on the pixels in the selected area around each of the second plurality of pixels.

6. The non-transitory program storage device of claim 5, wherein the instructions to cause the processor to select an area comprising a plurality of pixels surrounding each of the second plurality of pixels, comprise instructions to cause the processor to select an area comprising a plurality of pixels centered about each of the second plurality of pixels.

7. The non-transitory program storage device of claim 1, wherein the instructions to cause the processor to generate a candidate vector for each of a second plurality of pixels, further comprise instructions to cause the processor to normalize each of the candidate vectors.

8. The non-transitory program storage device of claim 1, further comprising instructions to cause the processor to identify an artifact in the face bounding box based on the selected at least one landmark pixel.

9. The non-transitory program storage device of claim 8, further comprising instructions to cause the processor to correct the identified artifact.

10. The non-transitory program storage device of claim 9, wherein the instructions to cause the processor to identify an artifact in the face bounding box based on the selected at least one landmark pixel, comprise instructions to cause the processor to identify a red-eye artifact.

11. The non-transitory program storage device of claim 1, wherein:
    the positive landmark population statistics are based on an a priori evaluation of a population of images known to contain the landmark; and
    the negative landmark population statistics are based on an a priori evaluation of a population of images known not to contain the landmark.

12. A digital image landmark detection method, comprising:
    obtaining a face bounding box comprising a first plurality of pixels;
    generating a candidate vector for each of a second plurality of pixels, the second plurality of pixels comprising a subset of the first plurality of pixels;
    reducing the dimensionality of each of the candidate vectors;
    applying positive landmark population statistics to each candidate vector to generate a positive likelihood value for each of the candidate vectors;
    applying negative landmark population statistics to each candidate vector to generate a negative likelihood value for each of the candidate vectors;
    combining each of the positive likelihood value and the negative likelihood value corresponding to the same candidate vector to form an overall likelihood value for each candidate vector; and
    selecting at least one pixel from the face bounding box as a landmark pixel based, at least in part, on the overall likelihood values.

13. The method of claim 12, wherein the act of generating a candidate vector for each of a second plurality of pixels comprises:

selecting an area comprising a plurality of pixels centered about each of the second plurality of pixels; and generating a candidate vector for each of the second plurality of pixels based, at least in part, on the pixels in the selected area around each of the second plurality of pixels.

14. The method of claim 12, wherein the act of generating a candidate vector for each of a second plurality of pixels, further comprises normalizing each of the candidate vectors.

15. The method of claim 12, wherein the act of generating a candidate vector for each of a second plurality of pixels, comprises:

generating a first vector for each of a second plurality of pixels, the second plurality of pixels comprising a subset of the first plurality of pixels; and reducing the dimensionality of each of the first vectors to create a candidate vector for each of a second plurality of pixels.

16. The non-transitory program storage device of claim 15, wherein the act of generating a positive likelihood value and a negative likelihood value for each of the candidate vectors, comprises:

applying positive landmark population statistics to each candidate vector to generate a positive likelihood value for each of the candidate vectors; and applying negative landmark population statistics to each candidate vector to generate a negative likelihood value for each of the candidate vectors.

17. The method of claim 12, further comprising:

identifying an artifact in the face bounding box based on the selected at least one landmark pixel; and correcting the identified artifact in an image corresponding to the face bounding box.

18. A non-transitory program storage device, readable by a processor and comprising instructions stored thereon to cause the processor to:

obtain a face bounding box comprising a first plurality of pixels, the face bounding box corresponding to at least part of a digital image;

partition the face bounding box into a plurality of evaluation regions;

select one of the evaluation regions, the selected evaluation region having a second plurality of pixels;

select a third plurality of pixels from the second plurality of pixels;

select an area comprising pixels surrounding each of the third plurality of pixels;

generate a first vector for each of the third plurality of pixels based, at least in part, on the pixels in the selected area around each of the third plurality of pixels;

reduce the dimensionality of each of the first vectors to create one candidate vector for each first vector;

apply positive landmark population statistics to each candidate vector to generate a positive likelihood value for each of the candidate vectors;

apply negative landmark population statistics to each candidate vector to generate a negative likelihood value for each of the candidate vectors;

combine each of the positive likelihood value and the negative likelihood value corresponding to the same candidate vector to form an overall likelihood value for each candidate vector;

select a candidate vector having the largest overall likelihood value;

identify a pixel in the face bounding box corresponding to the selected candidate vector as a landmark pixel; and identify an artifact in the face bounding box based on the selected landmark pixel.

\* \* \* \* \*

UNITED STATES PATENT AND TRADEMARK OFFICE
CERTIFICATE OF CORRECTION

| | | |
|---|---|---|
| PATENT NO. | : 8,774,519 B2 | Page 1 of 1 |
| APPLICATION NO. | : 13/568551 | |
| DATED | : July 8, 2014 | |
| INVENTOR(S) | : Michael Rousson | |

It is certified that error appears in the above-identified patent and that said Letters Patent is hereby corrected as shown below:

In the Claims:

Column 12, line 10 (Claim 5, line 7), add --for-- after "generate a candidate vector".

Signed and Sealed this
Sixteenth Day of September, 2014

Michelle K. Lee
*Deputy Director of the United States Patent and Trademark Office*